United States Patent
Lambert et al.

(10) Patent No.: US 10,040,890 B2
(45) Date of Patent: Aug. 7, 2018

(54) POLYURETHANE FOAM BY REACTION INJECTION MOLDING

(71) Applicants: James Michael Lambert, Staunton, VA (US); Douglas K. Farmer, Greensboro, NC (US); Achille Mayelle Bivigou Koumba, Charlottesville, VA (US)

(72) Inventors: James Michael Lambert, Staunton, VA (US); Douglas K. Farmer, Greensboro, NC (US); Achille Mayelle Bivigou Koumba, Charlottesville, VA (US)

(73) Assignee: INVISTA North America S.a r.l., Wilmington, DE (US)

( * ) Notice: Subject to any disclaimer, the term of this patent is extended or adjusted under 35 U.S.C. 154(b) by 93 days.

(21) Appl. No.: 14/442,294

(22) PCT Filed: Nov. 13, 2013

(86) PCT No.: PCT/US2013/069864
§ 371 (c)(1),
(2) Date: May 12, 2015

(87) PCT Pub. No.: WO2014/078395
PCT Pub. Date: May 22, 2014

(65) Prior Publication Data
US 2016/0280838 A1  Sep. 29, 2016

Related U.S. Application Data

(60) Provisional application No. 61/725,837, filed on Nov. 13, 2012.

(51) Int. Cl.
| | |
|---|---|
| *C08G 18/32* | (2006.01) |
| *C08J 9/00* | (2006.01) |
| *C08J 9/02* | (2006.01) |
| *B29C 44/38* | (2006.01) |
| *C08G 18/10* | (2006.01) |
| *C08G 18/08* | (2006.01) |
| *C08G 18/48* | (2006.01) |
| *C08G 18/76* | (2006.01) |
| *C08J 9/14* | (2006.01) |
| *B29L 31/58* | (2006.01) |
| *B29K 75/00* | (2006.01) |
| *B29C 44/34* | (2006.01) |
| *C08G 101/00* | (2006.01) |

(52) U.S. Cl.
CPC .......... *C08G 18/3228* (2013.01); *B29C 44/38* (2013.01); *C08G 18/10* (2013.01); *C08G 18/14* (2013.01); *C08G 18/4829* (2013.01); *C08G 18/7671* (2013.01); *C08J 9/0061* (2013.01); *C08J 9/02* (2013.01); *C08J 9/14* (2013.01); *B29C 44/3415* (2013.01); *B29K 2075/00* (2013.01); *B29L 2031/58* (2013.01); *C08G 2101/0008* (2013.01); *C08J 2201/022* (2013.01); *C08J 2205/06* (2013.01); *C08J 2375/08* (2013.01); *C08J 2375/12* (2013.01); *C08J 2475/02* (2013.01)

(58) Field of Classification Search
CPC .... C08G 18/10; C08G 18/14; C08G 18/3228; C08G 18/4829; C08G 18/7671; C08G 2101/0008; C08J 9/14; C08J 2205/06; C08J 2375/12
See application file for complete search history.

(56) References Cited

U.S. PATENT DOCUMENTS

| | | | | |
|---|---|---|---|---|
| 3,394,164 A | * | 7/1968 | McClellan | ............ C07C 263/18 521/106 |
| 4,092,275 A | * | 5/1978 | Reischl | .................. C08G 18/08 521/137 |
| 4,157,427 A | | 6/1979 | Ferber | |

(Continued)

FOREIGN PATENT DOCUMENTS

WO  2014/078395 A1  5/2014

OTHER PUBLICATIONS

International Search Report and Written Opinion Received for PCT Application No. PCT/US2013/069864, dated Feb. 26, 2014, 14 pages.
International Preliminary Report on Patentability Report Received for PCT Patent Application No. PCT/US2013/069864, dated May 28, 2015, 11 pages.
Siggia, S., "Quantitative Organic Analysis via Functional Group S", 3rd Edition, Wiley & Sons, New York, 1963, pp. 559-561.

*Primary Examiner* — John Cooney
(74) *Attorney, Agent, or Firm* — Bridget C. Sciamanna; Kathleen A. Tyrrell

(57) ABSTRACT

The present invention provides a method for preparing a foam that includes a polyurethaneurea dispersion. These foams have enhanced flexibility and resistance to compressibility compared to convention polyurethane foam. These foams may also be made by a reaction injection molding process. The method includes preparing a shaped polyurethane foam article by: (a) providing a first composition comprising at least one polyol, a chain extender composition and a blowing agent; (b) providing a second composition comprising at least one of a diisocyanate, a capped glycol, and combinations thereof; (c) mixing the first composition and the second composition to form a reaction mixture into a heated mold; and (d) allowing the reaction mixture to form a polyurethane foam; wherein the first composition includes one of: (i) the chain extender composition includes at least one amine compound; (ii) the blowing agent includes a polyurethaneurea aqueous dispersion; and (iii) combinations of (i) and (ii).

9 Claims, No Drawings

(56) References Cited

U.S. PATENT DOCUMENTS

| | | | |
|---|---|---|---|
| 4,722,989 A | 2/1988 | Starner et al. | |
| 4,727,094 A * | 2/1988 | Hoy | C08G 18/48 521/164 |
| 5,106,874 A | 4/1992 | Porter et al. | |
| 2003/0083394 A1 | 5/2003 | Clatty | |
| 2008/0004395 A1* | 1/2008 | Covelli | C08G 18/0823 524/591 |
| 2011/0201734 A1* | 8/2011 | Liu | C08G 18/0823 524/196 |

* cited by examiner

POLYURETHANE FOAM BY REACTION INJECTION MOLDING

BACKGROUND

Shaped polyurethane foam articles are used in a variety of uses including upholstery such as cushions, insulation and apparel such as foam cups for brassieres. The polyurethane foam articles are typically prepared using a solid block of polyurethane foam, which is molded under pressure and heat to prepare the desired shape. Due to the compression of the foam, the shaped foam has a non-uniform density compared to the original foam and also can lack flexibility.

SUMMARY OF THE INVENTION

Shaped foam articles for cushioning such as in furniture or automotive purposes as well as for apparel will benefit from resiliency, elasticity and flexibility. These desirable properties can be compromised by the molding process. Areas of compression molded articles that have been subjected to greater compression will have less flexibility and a higher density than other areas of the article, which causes a reduction in flexibility and resiliency of the polyurethane foam. These deficiencies can be avoided by preparing the article in the mold by reaction injection molding. The desired properties can be further improved by incorporating a polyurethaneurea into the polyurethane which provides an increased resiliency, elasticity and resistance to compression of the foam article.

In some aspects are a method for preparing a shaped polyurethane foam article including:
  (a) providing a first composition including at least one polyol, a chain extender composition and a blowing agent;
  (b) providing a second composition including at least one of a diisocyanate, a capped glycol, and combinations thereof;
  (c) mixing the first composition and the second composition to form a reaction mixture into a heated mold; and
  (d) allowing the reaction mixture to form a polyurethane foam;
wherein said first composition includes one of:
  (i) the chain extender composition includes at least one amine compound;
  (ii) the blowing agent includes a polyurethaneurea aqueous dispersion; and
  (iii) combinations of (i) and (ii).

Also provided is a shaped polyurethane foam article prepared by:
  a) providing a first composition including at least one polyol, a chain extender composition and a blowing agent;
  (b) providing a second composition including at least one of a diisocyanate, a capped glycol, and combinations thereof;
  (c) mixing the first composition and the second composition to form a reaction mixture into a heated mold; and
  (d) allowing the reaction mixture to form a polyurethane foam;
wherein said first composition includes one of:
  (i) the chain extender composition includes at least one amine compound;
  (ii) the blowing agent includes a polyurethaneurea aqueous dispersion; and
  (iii) combinations of (i) and (ii).

Another aspect provides a shaped polyurethane foam article including a reaction product of a mixture of a first and second composition mixed and injected into a mold:
  (a) the first composition comprising at least one polyol, a chain extender composition and a blowing agent;
  (b) the second composition comprising at least one of a diisocyanate, a capped glycol, and combinations thereof;
wherein said first composition includes one of:
  (i) the chain extender composition includes at least one amine compound;
  (ii) the blowing agent includes a polyurethaneurea aqueous dispersion; and
  (iii) combinations of (i) and (ii).

DETAILED DESCRIPTION

In some aspects are methods for preparing a polyurethane foam, or more specifically, a polyurethaneurea foam. The methods include incorporating urea groups into the polyurethane polymer which is prepared in a mold by a reaction injection molding process. Such process are well-known in the art and include the preparation of first composition including at least one polyol and separately an isocyanate composition which includes at least one isocyanate such as a diisocyanate or a diisocyanate capped glycol or a combination thereof. The first composition includes a combination of a polyol with a blowing agent and a chain extender composition. In order to achieve the inclusion of urea groups in the polymer, and also in the polyurethane foam, a polyurethaneurea aqueous dispersion may be included in the blowing agent or an amine compound may be included in the chain extender composition or both.

As used herein, "solvent" refers to an organic solvent such as dimethylacetamide (DMAC), dimethylformamide (DMF) and N-methyl pyrrolidone.

Suitable polyol components include polyether glycols, polycarbonate glycols, and polyester glycols of number average molecular weight of about 600 to about 7,000, including from about 1,000 to about 7,000 and about 2,000 to about 7,000. Mixtures of two or more polyols or copolymers can be included.

Examples of polyether polyols that can be used include those glycols with two or more hydroxy groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, such as a diol or diol mixtures, with less than 12 carbon atoms in each molecule, such as ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polyether polyol is preferred, and a poly(tetramethylene ether) glycol of molecular weight of about 1,700 to about 2,100, such as Terathane® 1800 (INVISTA of Wichita, Kans.) with a functionality of 2, is one example of a specific suitable polyol. Co-polymers can include poly(tetramethylene-co-ethyleneether) glycol.

Examples of polyester polyols that can be used include those ester glycols with two or more hydroxy groups, produced by condensation polymerization of aliphatic polycarboxylic acids and polyols, or their mixtures, of low molecular weights with no more than 12 carbon atoms in each molecule. Examples of suitable polycarboxylic acids are malonic acid, succinic acid, glutaric acid, adipic acid, pimelic acid, suberic acid, azelaic acid, sebacic acid, undecanedicarboxylic acid, and dodecanedicarboxylic acid. Examples of suitable polyols for preparing the polyester polyols are ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear bifunctional polyester polyol with a melting temperature of about 5° C. to about 50° C. is an example of a specific polyester polyol.

Examples of polycarbonate polyols that can be used include those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Examples of suitable polyols for preparing the polycarbonate polyols are diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polycarbonate polyol with a melting temperature of about 5° C. to about 50° C. is an example of a specific polycarbonate polyol.

The diisocyanate component can also include a single diisocyanate or a mixture of different diisocyanate including an isomer mixture of diphenylmethane diisocyanate (MDI) containing 4,4'-methylene bis(phenyl isocyanate) and 2,4'-methylene bis(phenyl isocyanate). Any suitable aromatic or aliphatic diisocyanate can be included. Examples of diisocyanates that can be used include, but are not limited to, 1-isocyanato-4-[(4-isocyanatophenyl)methyl]benzene, 1-isocyanato-2-[(4-cyanatophenyl)methyl]benzene, bis(4-isocyanatocyclohexyl)methane, 5-isocyanato-1-(isocyanatomethyl)-1,3,3-trimethylcyclohexane, 1,3-diisocyanato-4-methyl-benzene, 2,2'-toluenediisocyanate, 2,4'-toluenediisocyanate, and mixtures thereof. Examples of specific polyisocyanate components include Mondur® ML (Bayer), Lupranate® MI (BASF), and Isonate® 50 O,P' (Dow Chemical), and combinations thereof.

When a polyurethane is desired, the chain extender is a diol. Examples of such diols that may be used include, but are not limited to, ethylene glycol, 1,3-propanediol, 1,2-propylene glycol, 3-methyl-1,5-pentanediol, 2,2-dimethyl-1,3-trimethylene diol, 2,2,4-trimethyl-1,5-pentanediol, 2-methyl-2-ethyl-1,3-propanediol, 1,4-bis(hydroxyethoxy)benzene, and 1,4-butanediol and mixtures thereof.

In order to achieve the inclusion of urea groups in polyurethane foam, one option is to add an amine compound to the chain extender composition. The amine compound may be selected from a diamine, an amine compound having a hydroxyl functional group, and combinations thereof. A chain extender for a polyurethaneurea is typically either water or a diamine chain extender for a polyurethaneurea. Combinations of different chain extenders may be included depending on the desired properties of the foam. Examples of suitable diamine chain extenders include: hydrazine; 1,2-ethylenediamine; 1,4-butanediamine; 1,2-butanediamine; 1,3-butanediamine; 1,3-diamino-2,2-dimethylbutane; 1,6-hexamethylenediamine; 1,12-dodecanediamine; 1,2-propanediamine; 1,3-propanediamine; 2-methyl-1,5-pentanediamine; 1-amino-3,3,5-trimethyl-5-aminomethyl-cyclohexane; 2,4-diamino-1-methylcyclohexane; N-methyl-amino-bis(3-propylamine); 1,2-cyclohexanediamine; 1,4-cyclohexanediamine; 4,4'-methylene-bis(cyclohexylamine); isophorone diamine; 2,2-dimethyl-1,3-propanediamine; meta-tetramethylxylenediamine; 1,3-diamino-4-methylcyclohexane; 1,3-cyclohexane-diamine; 1,1-methylene-bis(4,4'-diaminohexane); 3-aminomethyl-3,5,5-trimethylcyclohexane; 1,3-pentanediamine (1,3-diaminopentane); m-xylylene diamine; and Jeffamine® (Texaco).

Hindered amines may also be included as the amine compound. Examples include N,N'-dimethyl-1,3-propanediamine, N,N'-dimethyl-1,6-hexanediamine, N,N'-dibutylbenzene-1,4-diamine, N,N'-dimethyl-1,2-phenylenediamine, and combinations thereof, among others.

Examples of amine compounds including a hydroxyl functional group include ethanolamine, propanolamine, methanolamine, and combinations thereof, among others.

A diol may alone be used as the chain extender composition in the first composition for the reaction injection molding, which includes the polyol. However, when an amine compound is added to the chain extender composition, the chain extender will include both an amine compound and a diol. The weight ratio of the diol to the amine compound may be at least 75:25. Other suitable ranges include about 50:50 to about 95:5. Another suitable example is about 80:20 to about 90:10.

Where a polyurethaneurea aqueous dispersion is added to blowing agent, the dispersion may be the reaction product of:

(1) at least one polyol selected from polyethers, polyesters, polycarbonates, and combinations thereof, wherein the polyol has a number average molecular weight of 600 to 4000;

(2) a polyisocyanate including at least one aromatic diisocyanate;

(3) optionally a neutralizing agent and a diol compound including: (i) hydroxy groups capable of reacting with polyisocyanate, and (ii) at least one carboxylic acid group capable of forming a salt upon neutralization, wherein said at least one carboxylic acid group is incapable of reacting with the polyisocyanate;

(4) a chain extender selected from the group consisting of diamine chain extenders, water, and combinations thereof; and (5) optionally including a blocking agent for isocyanate; and (6) at least one surface active agent or surfactant.

The polyurethane aqueous dispersion may be substantially free of solvent. With respect to the first composition, which includes the polyol, the polyurethaneurea aqueous dispersion may present in an amount of about 1.0% to about 50.0% by weight of the first composition. Other suitable amounts for inclusion of the polyurethaneurea aqueous dispersion into the blowing agent include about 5.0% to about 20.0% by weight of the first composition; 5.0% to about 15.0% by weight of the first composition, and about 10.0% to about 20.0% by weight of the first composition.

Aqueous polyurethaneurea dispersions falling within the scope of the present invention are provided from particular urethane prepolymers, which also form an aspect of some embodiments.

In some embodiments, a segmented polyurethaneurea for making a polyurethaneurea aqueous dispersion includes: a) a polyol or a polyol copolymer or a polyol mixture of number average molecular weight between 500 to 5000 (such as from about 600 to 4000 and 600 to 3500), including but not limited to polyether glycols, polyester glycols, polycarbonate glycols, polybutadiene glycols or their hydrogenated derivatives, and hydroxy-terminated polydimethylsiloxanes; b) a polyisocyanate including diisocyanates such as aliphatic diisocyanates, aromatic diisocyanates and alicyclic diisocyanates; and c) a diol compound d including: (i) hydroxy groups capable of reacting with polyisocyanate, and (ii) at least one carboxylic acid group capable of forming a salt upon neutralization, wherein the at least one carboxylic acid group is incapable of reacting with the polyisocyanate; d) a chain extending such as water or an diamine chain extender including aliphatic diamine chain extenders or the combination of an aliphatic diamine chain extender with one or more diamines selected from aliphatic diamines and alicyclic diamines having 2 to 13 carbon atoms, or an amino-terminated polymer; and e) optionally a monoalcohol or monoamine, primary or secondary, as a blocking agent or chain terminator; and optionally an organic compound or a polymer with at least three primary or secondary amine groups.

The urethane prepolymers of some embodiments, also known as capped glycols, can generally be conceptualized as the reaction product of a polyol, a polyisocyanate, and a compound capable of salt-forming upon neutralization, before the prepolymer is dispersed in water and is chain-extended. Such prepolymers can typically be made in one or more steps, with or without solvents which can be useful in reducing the viscosity of the prepolymer composition. Capped glycols may also be included in the second composition for the reaction injection molding either as the sole component of the composition or in combination with a polyisocyanate such as a diisocyanate.

Depending on whether the prepolymer is dissolved in a less volatile solvent (such as NMP) which will remain in the dispersion; dissolved in a volatile solvent such as acetone or methylethyl ketone (MEK), which can be later removed; or is dispersed in water without any solvent; the dispersion process can be classified in practice as the solvent process, acetone process, or prepolymer mixing process, respectively. The prepolymer mixing process has environmental and economical advantages, and may be used in the preparation of aqueous dispersion with substantially no added solvent.

In the prepolymer mixing process, it is important that the viscosity of the prepolymer is adequately low enough, with or without dilution by a solvent, to be transported and dispersed in water. One embodiment relates to polyurethaneurea dispersions derived from such a prepolymer, which meet this viscosity requirement and do not have any organic solvent in the prepolymer or in the dispersion. In accordance with the invention, the prepolymer is the reaction product of a polyol, a diisocyanate and a diol compound.

Depending on the desired effect of the polyurethaneurea dispersion, the weight average molecular weight of the polymer in the dispersion may vary from about 40,000 to about 250,000, including from about 40,000 to about 150,000; from about 100,000 to about 150,000; and about 120,000 to about 140,000.

A diol compounds which may be included in some polyurethaneurea aqueous dispersions of some embodiments. These may include at least one diol compound with: (i) two hydroxy groups capable of reacting with the polyisocyanates; and (ii) at least one carboxylic acid group capable of forming salt upon neutralization and incapable of reacting with the polyisocyanates (b). Typical examples of diol compounds having a carboxylic acid group, include 2,2-dimethylopropionic acid (DMPA), 2,2-dimethylobutanoic acid, 2,2-dimethylovaleric acid, and DMPA initiated caprolactones such as CAPA® HC 1060 (Solvay).

Neutralizing agents should be included when an acidic diol is included in the polyurethaneurea aqueous dispersion of some aspects. Examples of suitable neutralizing agents to convert the acid groups to salt groups include: tertiary amines (such as triethylamine, N,N-diethylmethylamine, N-methylmorpholine, N,N-diisopropylethylamine, and triethanolamine) and alkali metal hydroxides (such as lithium, sodium and potassium hydroxides). Primary and/or secondary amines may be also used as the neutralizing agent for the acid groups. The degrees of neutralization are generally between about 60% to about 140%, for example, in the range of about 80% to about 120% of the acid groups.

Examples of suitable surface active agents (surfactants) include: anionic, cationic, or nonionic dispersants or surfactants, such as sodium dodecyl sulfate, sodium dioctyl sulfosuccinate, sodium dodecylbenzenesulfonate, ethoxylated alkylphenols such as ethoxylated nonylphenols, and ethoxylated fatty alcohols, lauryl pyridinium bromide, polyether phosphates and phosphate esters, modified alcohol-ethoxylates, and combinations thereof.

In the prepolymer mixing process, the prepolymer can be prepared by mixing starting materials, namely the polyol, the polyisocyanate and the diol compound together in one step and by reacting at temperatures of about 50° C. to about 100° C. for adequate time until all hydroxy groups are essentially consumed and a desired % NCO of the isocyanate group is achieved. Alternatively, this prepolymer can be made in two steps by first reacting a polyol with excess polyisocyanate, followed by reacting with a diol compound until a final desired % NCO of the prepolymer is achieved. For example, the % NCO may range from about 1.3 to about 6.5, such as from about 1.8 to about 2.6. Significantly, no organic solvent is necessary, but may be added or mixed with the starting materials before, during or after the reaction. Optionally, a catalyst may be used to facilitate the prepolymer formation.

In the polyurethane aqueous dispersion of some embodiments, the prepolymer includes a polyol, a polyisocyanate, and a diol which are combined together and provided in the following ranges of weight percentages, based on the total weight of the prepolymer:

about 34% to about 89% of polyol, including from about 61% to about 80%;
about 10% to about 59% of polyisocyanate, including from about 18% to about 35%; and
about 1.0% to about 7.0% of diol compound, including from about 2.0% to about 4.0%.

A monofunctional alcohol may be included with the prepolymer in order to control the weight average molecular weight of the polyurethaneurea polymer in the polyurethane aqueous dispersion.

The prepolymer for the polyurethane aqueous dispersion of some aspects may be prepared from the polyol, polyisocyanate, diol compound and optionally a blocking agent such as a monofunctional alcohol, may have a bulk viscosity (with or without solvent present) below about 6,000 poises, including below about 4,500 poises, measured by the falling ball method at 40° C. This prepolymer, containing carboxylic acid groups along the polymer chains (from the diol compound), can be dispersed with a high-speed disperser into a de-ionized water medium that includes: at least one neutralizing agent, to form an ionic salt with the acid; at least one surface active agent (ionic and/or non-ionic dispersant or surfactant); and, optionally, at least one chain extension component. Alternatively, the neutralizing agent can be mixed with the prepolymer before being dispersed into the water medium. At least one antifoam and/or defoam agent and/or at least one rheological modifier can be added to the water medium before, during, or after the prepolymer is dispersed. These polyurethane aqueous dispersions can be substantially free of added solvent.

Polyurethane aqueous dispersions falling within some aspects may have a wide range of solids contents depending on the desired end use of the dispersion. Examples of suitable solids contents for the dispersions of some embodiments include from about 10% to about 50% by weight, for example from about 30% to about 45% by weight. The amount of water in the dispersion may be limited, such as less than about 40% by weight of the dispersion. Other suitable amounts may be less than about 20% by weight water or less than 10% by weight water.

The viscosity of polyurethane aqueous dispersions may also be varied in a broad range from about 10 centipoises to about 100,000 centipoises depending on the processing and application requirements. For example, in one embodiment, the viscosity is in the range of about 500 centipoises to about 30,000 centipoises. The viscosity may be varied by using an appropriate amount of thickening agent, such as from about 0 to about 2.0 wt %, based on the total weight of the aqueous dispersion.

In the solvent process or acetone process, an organic solvent may also be used in the preparation polyurethane aqueous dispersions of some embodiments. The organic solvent may be used to lower the prepolymer viscosity through dissolution and dilution and/or to assist the dispersion of solid particles of the diol compound having a carboxylic acid group such as 2,2-dimethylopropionic acid (DMPA) to enhance the dispersion quality.

The solvents selected for these purposes are substantially or completely non-reactive to isocyanate groups, stable in water, and have a good solubilizing ability for DMPA, the formed salt of DMPA and triethylamine, and the prepolymer. Examples of suitable solvents include N-methylpyrrolidone, N-ethylpyrrolidone, dipropylene glycol dimethyl ether, propylene glycol n-butyl ether acetate, N,N-dimethylacetamide, N,N-dimethylformamide, 2-propanone (acetone) and 2-butanone (methylethylketone or MEK).

In the solvent process, the amount of solvent added to the dispersion of some embodiments may vary. When a solvent is include, suitable ranges of solvent include amounts of less than 50% by weight of the dispersion. Smaller amounts may also be used such as less than 20% by weight of the dispersion, less than 10% by weight of the dispersion, less than 5% by weight of the dispersion and less than 3% by weight of the dispersion.

In the acetone process, a greater amount of solvent may be added to the prepolymer composition prior to the preparation of the polyurethane aqueous dispersion. Alternatively, the prepolymer may be prepared in the solvent. The solvent may also be removed from the dispersion after dispersion of the prepolymer such as under vacuum.

There are many ways to incorporate the organic solvent into the dispersion at different stages of the manufacturing process for the polyurethane aqueous dispersion of some embodiments, for example:
1) The solvent can be added to and mixed with the prepolymer after the polymerization is completed prior to transferring and dispersing the prepolymer, the diluted prepolymer containing the carboxylic acid groups (from the diol compound) in the backbone and isocyanate groups at the chain ends is neutralized and chain extended while it is dispersed in water.
2) The solvent can be added and mixed with other ingredients such as polyol, polyisocyanate and diol compound to make a prepolymer in the solution, and then this prepolymer containing the carboxylic acid groups in the backbone and isocyanate groups at the chain ends in the solution is dispersed in water and at the same time it is neutralized and chain extended.
3) The solvent can be added with a neutralized salt of a diol compound and a neutralizing agent and mixed with a polyol and polyisocyanate to make the prepolymer prior to dispersion.
4) The solvent can be mixed with TEA, and then added to the formed prepolymer prior to dispersion.
5) The solvent can be added and mixed with the polyol, followed by the addition of the diol compound and neutralizing agent, and then the polyisocyanate in sequence to a neutralized prepolymer in solution prior to dispersion.
6) The solvent may also be removed from the dispersion, especially in the case of the acetone process.

Suitable methods for reaction injection molding to make polyurethanes are known by those of skill in the art. One method involves impingement mixing of polyols with isocyanates under high pressure and injecting the resulting mixture into a mold. Those of skill in the art will recognize that other methods of reaction injection molding are suitable with the compositions described herein.

In some embodiments, the first composition including the polyol and the second composition including the isocyanate are mixed, for example, by impingement mixing head 20, in which the polyol mixture and isocyanate mixture impingement-mixed (defined herein as meaning that the first and second compositions are mixed with each other as liquid streams that are impinged on each other under high pressure (i.e., 1500 psi (10.3 MPa) or more), with consequent turbulence). Such impingement mixing, and reaction injection molding in general, is also characterized by the fact that the liquid reactants are mixed with each other over a very short time scale (e.g., within one second or less) and then quickly (e.g., within a few seconds after being mixed) delivered into a mold.

The resulting mixture of polyols and isocyanates can then be injected (e.g., by way of a nozzle) into a mold, within which the isocyanates and polyols will react with each other to form polyurethane foam. In at least some embodiments, the mixture of polyols and isocyanates may be chosen to fill only a certain percentage (e.g., 5-20 volume %) of the interior volume of the mold. The development of void spaces and consequent formation of a foamed structure will then provide that the polyurethane expands to fill the interior of mold to form a so-called bun which assumes the shape of the mold interior.

Conventionally in the reaction injection molding of polyurethane foam, physical blowing agents and/or gaseous nucleation agents (e.g., volatile liquids such as alkanes, haloalkanes, and the like; and/or gases such as air, carbon dioxide or nitrogen, etc.) are employed (e.g., injected into one or both of the liquid mixtures) in order to promote and/or control the development of void spaces (e.g., cells) that is characteristic of a foamed material. Such approaches are described e.g. in U.S. Pat. No. 4,157,427 to Ferber. In some embodiments, water alone or a polyurethaneurea aqueous dispersion may be used as the blowing agent. The amount of blowing agent used may be from about 0.5% to about 50% by weight of the first composition including the polyol. Other suitable amounts include about 5% to about 30%, about 10% to about 25% and about 10% to about 20% by weight of the first composition.

The polyurethane foams described herein are prepared by combining and reacting a second composition including at least one polyisocyanate or capped glycol with a first composition including at least one polyol. This first composition may also include several other types of components or additives used to adjust the properties of polyurethane foam, such as cross-linkers, chain extenders, cell openers, surfactants, and blowing agents. The total amount of cross-linkers and chain extenders will be sufficient to cause cross-linking and/or chain extension, as desired, to occur in the polyurethane product. The total amount of cross-linkers and chain extenders ranges generally from about 5% to about 15% by weight of the first composition. Examples of cross-linkers and chain extenders include hydroxyl functional compounds, such as diols and triols. In one preferred formulation, the first composition used to form the polyurethane foam may include a diol that acts as both cross-linker and chain extender and, optionally, a triol cross linker. For example, the diol cross-linker/chain extender may include polyethylene glycol 400 (PEG 400) having a hydroxyl number ranging from about 267 to about 295, such as Polyglykol 400, which is supplied by the Clariant Corporation. In another example, a triol cross-linker may be glycerine(i,2,3 tri-hydloxy propane). A diol cross linker and chain extender is may be present in an amount that is effective to cause cross linking and chain extension to occur in the polyurethane. The triol cross linker may be present in an amount that is effective to cause cross-linking to occur in the polyurethane.

The first component may also comprise one or more catalysts, which may be present in an amount ranging from about 1% to about 10% by weight of the first composition. The use of multiple catalysts may aid in selectively adjusting the relative kinetics of the polyurethane formation and carbon dioxide generation reactions.

The first composition may also include one or more cell opening compounds (cell-openers). Foams can be generally characterized as "open cell" or "closed cell" depending on whether the windows of adjacent cells are open (i.e., such that the cells are in communication with one another) or closed. In some embodiments, the polyurethane foams described herein may have at least about 80 percent open cells. The cell opening compounds facilitate the production of open cells. Exemplary cell openers include silicon-based antifoamers, waxes, finely divided solids, liquid perfluorocarbons, paraffin oils, long chain fatty acids, and combinations thereof. If a cell opener is used, it may present in an amount that is sufficient to provide the desired percentage of open cells. In some aspects, the cell opener may be present an amount that is less than one percent by weight of the first composition, such as about 0.01 and about 0.1 percent by weight. One exemplary cell opener that may be used is Ortegol® 501, a solution of organic polymers having a hydroxyl number of about 2 which is supplied by Evonik Industries.

To facilitate cell formation and stabilization, one or more surfactants may also be included in the first composition. Examples of surfactants include nonionic surfactants and wetting agents, such as those prepared by the sequential addition of propylene oxide and then ethylene oxide to propylene glycol, the solid or liquid organosilicones, polyethylene glycol ethers of long chain alcohols, tertiary amine or alkylolamine salt of long chain alkyl acid sulfate esters, alkyl sulfonic ester and alkyl arylsulfonic acids. The total amount of surfactant is generally less than about 2% by weight of the first composition.

Additives

Classes of additives that may be optionally included in polyurethaneurea compositions and/or in the first component including the polyol are listed below. An exemplary and non-limiting list is included. However, additional additives are well-known in the art. Examples include: antioxidants, UV stabilizers, colorants, pigments, cross-linking agents, phase change materials (paraffin wax), antimicrobials, minerals (i.e., copper), microencapsulated additives (i.e., aloe vera, vitamin E gel, aloe vera, sea kelp, nicotine, caffeine, scents or aromas), nanoparticles (i.e., silica or carbon), calcium carbonate, flame retardants, antitack additives, chlorine degradation resistant additives, vitamins, medicines, fragrances, electrically conductive additives, dyeability and/or dye-assist agents (such as quaternary ammonium salts). Other additives which may be added to the polyurethaneurea compositions include adhesion promoters, anti-static agents, anti-creep agents, optical brighteners, coalescing agents, electroconductive additives, luminescent additives, lubricants, organic and inorganic fillers, preservatives, texturizing agents, thermochromic additives, insect repellants, and wetting agents, stabilizers (hindered phenols, zinc oxide, hindered amine), slip agents(silicone oil) and combinations thereof.

The additive may provide one or more beneficial properties including: dyeability, hydrophobicity (i.e., polytetrafluoroethylene (PTFE)), hydrophilicity (i.e., cellulose), friction control, chlorine resistance, degradation resistance (i.e., antioxidants), adhesiveness and/or fusibility (i.e., adhesives and adhesion promoters), flame retardance, antimicrobial behavior (silver, copper, ammonium salt), barrier, electrical conductivity (carbon black), tensile properties, color, luminescence, recyclability, biodegradability, fragrance, tack control (i.e., metal stearates), tactile properties, set-ability, thermal regulation (i.e., phase change materials), nutriceutical, delustrant such as titanium dioxide, stabilizers such as hydrotalcite, a mixture of huntite and hydromagnesite, UV screeners, and combinations thereof.

The following examples illustrate but do not limit the invention. The particularly advantageous features of the invention may be seen in contrast to the comparative examples, which do not possess the distinguishing characteristics of the invention.

EXAMPLES

Terathane® 1800 is a linear polytetramethylene ether glycol (PTMEG), with a number average molecular weight of 1,800 (commercially available from INVISTA S.à. r.L., of Wichita, Kans.); this corresponds to the glycol for Examples 1-21 below.

Pluracol® HP 4000D is a linear, primary hydroxyl terminated polypropylene ether glycol, with a number average molecular weight of 4000 (commercially available from BASF, Bruxelles, Belgium);

Mondur® ML is an isomer mixture of diphenylmethane diisocyanate (MDI) containing 50-60% 2,4'-MDI isomer and 50-40% 4,4'-MDI isomer (commercially available from Bayer, Baytown, Tex.);

Lupranate® MI is an isomer mixture of diphenylmethane diisocyanate (MDI) containing 45-55% 2,4'-MDI isomer and 55-45% 4,4'-MDI isomer (commercially available from BASF, Wyandotte, Mich.);

Isonate® 125MDR is a pure mixture of diphenylmethane diisocyanate (MDI) containing 98% 4,4'-MDI isomer and 2% 2,4'-MDI isomer (commercially available from the Dow Company, Midland, Mich.); and DMPA is 2,2-dimethylopropionic acid.

The prepolymer examples, below, were prepared with MDI isomer mixtures, such as Lupranate® MI and Mondur® ML, containing a high level of 2,4'-MDI.

Prepolymer Preparation

The preparation of the prepolymers was conducted in a glove box with nitrogen atmosphere. A 2000 ml Pyrex® glass reaction kettle, which was equipped with an air pressure driven stirrer, a heating mantle, and a thermocouple temperature measurement, was charged with about 382.5 grams of Terathane® 1800 glycol and about 12.5 grams of DMPA. This mixture was heated to about 50° C. with stirring, followed by the addition of about 105 grams of Lupranate® MI diisocyanate. The reaction mixture was then heated to about 90° C. with continuous stirring and held at about 90° C. for about 120 minutes, after which time the reaction was completed, as the % NCO of the mixture declined to a stable value, matching the calculated value (% NCO aim of 1.914) of the prepolymer with isocyanate end groups. The viscosity of the prepolymer was determined in accordance with the general method of ASTM D1343-69 using a Model DV-8 Falling Ball Viscometer (sold by Duratech Corp., Waynesboro, Va.) operated at about 40° C. The total isocyanate moiety content, in terms of the weight percent of NCO groups, of the capped glycol prepolymer was measured by the method of S. Siggia, "Quantitative Organic Analysis via Functional Group", 3rd Edition, Wiley & Sons, New York, pp. 559-561 (1963), the entire disclosure of which is incorporated herein by reference.

Dispersion Preparation

A 2,000 ml stainless steel beaker was charged with about 700 grams of de-ionized water, about 15 grams of sodium dodecylbenzenesulfonate (SDBS), and about 10 grams of triethylamine (TEA). This mixture was then cooled with ice/water to about 5° C. and mixed with a high shear laboratory mixer with rotor/stator mix head (Ross, Model 100LC) at about 5,000 rpm for about 30 seconds. The viscous prepolymer, contained in a metal tubular cylinder, was added to the bottom of the mix head in the aqueous solution through flexible tubing with applied air pressure. The temperature of the prepolymer was maintained between about 50° C. and about 70° C. The extruded prepolymer stream was dispersed and chain-extended with water under the continuous mixing of about 5,000 rpm. In a period of about 50 minutes, a total amount of about 540 grams of prepolymer was introduced and dispersed in water. Immediately after the prepolymer was added and dispersed, the dispersed mixture was charged with about 2 grams of Additive 65 (commercially available from Dow Corning®, Midland Mich.) and about 6 grams of diethylamine (DEA). The reaction mixture was then mixed for about another 30 minutes. The resulting solvent-free aqueous dispersion was milky white and stable. The viscosity of the dispersion was adjusted with the addition and mixing of Hauthane HA thickening agent 900 (commercially available from Hauthway, Lynn, Mass.) at a level of about 2.0 wt % of the aqueous dispersion. The viscous dispersion was then filtered through a 40 micron Bendix metal mesh filter and stored at room temperatures for film casting or lamination uses. The dispersion had solids level of 43% and a viscosity of about 25,000 centipoises.

| Example | Part A (Diisocyanate-4,4-MDI) grams | Part B (Glycol) grams | Dispersion grams | Alternate glycol grams |
|---|---|---|---|---|
| 1-Control | 25.28 | 25.25 | | |
| 2-Control | 25.01 | 25.02 | | |
| 3 | 12.5 | 12.5 | 12.63 | |
| 4-Control | 25.05 | 24.71 | | |
| 5 | 25.01 | 13.25 | 13.75 | |
| 6 | 12.54 | 26.33 | 13.93 | |
| 7 | 25.08 | 23.75 | 1.35 | |
| 8 | 25.07 | 22.5 | 2.53 | |
| 9 | 25.05 | 18.80 | 6.40 | |
| 10 | 25.07 | 6.27 | 18.83 | |
| 11 | 25.08 | 0 | 25.22 | |
| 12 | 25 | 23.75 | 0.7025 dispersion | w/ 0.7112 glycol |
| 13 | 25 | 22.5 | 1.255 dispersion | w/ 1.2702 glycol |
| 14 | 25 | 18.75 | 3.125 dispersion | w/ 3.1315 glycol |
| 15 | 25 | 6.25 | 9.375 dispersion | w/ 9.375 glycol |
| 16 | 25 | 0 | 12.5 dispersion | w/ 12.5 glycol |
| 17 | 25.03 | 23.73 | | 1.3 glycol |
| 18 | 25 | 22.53 | | 2.53 glycol |
| 19 | 25.03 | 18.76 | | 6.28 glycol |
| 20 | 25.05 | 6.28 | | 18.80 glycol |
| 21 | 25.04 | 0 | | 25 glycol |

Foam Preparation

Example 1, 2 and 4

1) Weigh the Part A diisocyanate out into a cup 2) Weigh the Part B glycol into a different cup 3) Use wooden stick to "mix" Part B (even though there is not anything other than Part B in the cup) 4) Pour contents of Part B cup into Part A cup using the wooden stick to scrap out as much of the Part B liquid as possible 5) Use the same wooden stick as in #3 above to mix the Part A/Part B mixture now in Part A cup.

Example 3

1) Weigh the Part A diisocyanate out into a cup 2) Weigh the Part B glycol into a different cup 3) Weigh the dispersion in the same cup as Part B glycol 4) Use wooden stick to mix Part B glycol and dispersion 5) Pour contents of Part B cup into Part A diisocyanate cup using the wooden stick to scrap out as much of the Part B liquid as possible 6) Use the same wooden stick as in #4 above to mix the Part A/Part B mixture now in Part A cup.

Examples 5 to 21

1) Weigh the Part A diisocyanate out into a cup 2) Weigh the Part B glycol into a different cup 3) Weigh the dispersion in the same cup as Part B glycol 4) Use wooden stick to mix Part B glycol and dispersion 5) Pour contents of Part B cup into Part A diisocyanate cup using the wooden stick to scrap out as much of the Part B liquid as possible 6) Use the same wooden stick as in #4 above to mix the Part A/Part B mixture now in Part A cup. Make extra of the Part B cup to account for material that will stick in the cup.

The foams prepared above where tested according to ASTM D5736. Results follow:

|  | Example | | | | | | | | |
|---|---|---|---|---|---|---|---|---|---|
|  | 1-Control | 2-Control | 4-Control | 7 | 12 | 13 | 17 | 18 | 19 |
| no load | 0.0535 | 0.055 | 0.052 | 0.053 | 0.0545 | 0.0525 | 0.052 | 0.0535 | 0.0525 |
| 1.6 kg | −0.002 | −0.0015 | −0.002 | −0.002 | −0.002 | −0.0025 | −0.0015 | −0.0015 | −0.0015 |
| no load | −0.0005 | −0.0005 | −0.001 | −0.0005 | −0.001 | −0.001 | −0.0005 | −0.0005 | −0.0005 |
| 3.2 kg | −0.003 | −0.0025 | −0.0025 | −0.003 | −0.003 | −0.0035 | −0.002 | −0.002 | −0.002 |
| no load | −0.001 | −0.001 | −0.001 | −0.001 | −0.001 | −0.001 | −0.0005 | −0.001 | −0.001 |

Examples 13 and 17 exhibit particularly optimal properties compared to the remaining examples with respect to compressibility and recovery.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

The invention claimed is:

1. A method for preparing a shaped polyurethane foam article comprising:
    (a) providing a first composition comprising at least one polyol, a chain extender composition and a blowing agent;
    (b) providing a second composition comprising at least one of a diisocyanate, a diisocyanate capped glycol, and combinations thereof;
    (c) impingement mixing said first composition and said second composition under pressure of 1500 psi or higher to form a reaction mixture; and
    (d) injecting the reaction mixture into a mold with an interior volume to fill 5-20 volume % of the interior volume of the mold to form a polyurethane foam article;
wherein said first composition includes a polyurethaneurea aqueous dispersion comprising:
a polymer which is the reaction product of:
    (1) at least one polyol selected from polyethers, polyesters, polycarbonates, and combinations thereof, wherein the polyol has a number average molecular weight of 600 to 4000;
    (2) a polyisocyanate comprising at least one aromatic diisocyanate;
    (3) optionally a neutralizing agent and a diol compound comprising: (i) hydroxy groups capable of reacting with polyisocyanate, and (ii) at least one carboxylic acid group capable of forming a salt upon neutralization, wherein said at least one carboxylic acid group is incapable of reacting with the polyisocyanate;
    (4) a chain extender selected from the group consisting of diamine chain extenders, water, and combinations thereof; and
    (5) optionally including a blocking agent for isocyanate; and
    (6) at least one surface active agent.

2. The method of claim 1, wherein said chain extender comprises a dial.

3. The method of claim 1, wherein said amine compound is selected from a diamine, an amine compound having a hydroxyl functional group, and combinations thereof.

4. The method of claim 2, wherein a weight ratio of said diol to said diamine compound is at least 75:25.

5. The method of claim 1, wherein said amine compound is selected from the group consisting of 1,2-ethylenediamine, 1,4-butanediamine, 1,6-hexamethylenediamine, 1,12-dodecanediamine, 1,2-propanediamine, 2-methyl-1,5-pentanediamine, 1,2-cyclohexanediamine, 1,4-cyclohexanediamine, 4,4'-methylene-bis(cyclohexylamine), isophorone diamine, 2,2-dimethyl-1,3-propanediamine, meta-tetramethylxylenediamine, N,N'-dimethyl-1,3-propanediamine, N,N'-dimethyl-1,6-hexanediamine, N,N'-dibutyl-benzene-1,4-diamine, N,N'-dimethyl-1,2-phenylenediamine, ethanolamine, propanolamine, methanolamine, and combinations thereof.

6. The method of claim 2, wherein said diol is selected from the group consisting of ethylene glycol, 1,3-propanediol, 1,2-propylene glycol, 3-methyl-1,5-pentanediol, 2,2-dimethyl-1,3-trimethylene diol, 2,2,4-trimethyl-1,5-pentanediol, 2-methyl-2-ethyl-1,3-propanediol, 1,4-bis(hydroxyethoxy)benzene, and 1,4-butanediol and combinations thereof.

7. The method of claim 1, wherein said polyurethaneurea aqueous dispersion is substantially free of solvent.

8. The method of claim 1, wherein said polyurethaneurea aqueous dispersion is present in an amount of about 1.0% to about 50.0% by weight of the first composition.

9. The method of claim 1, wherein said polyurethaneurea aqueous dispersion is present in an amount of about 5.0% to about 20.0% by weight of the first composition.

* * * * *